United States Patent [19]

McClelland et al.

[11] Patent Number: 4,618,514
[45] Date of Patent: Oct. 21, 1986

[54] ALIGNMENT LAYER FOR LIQUID CRYSTAL DISPLAY

[75] Inventors: Sandra K. McClelland, Bordentown Township, Burlington County; Eugene S. Poliniak, Willingboro Township, Burlington County, both of N.J.

[73] Assignee: RCA Corporation, Princeton, N.J.

[21] Appl. No.: 811,877

[22] Filed: Dec. 20, 1985

[51] Int. Cl.⁴ .............................................. C09K 3/34
[52] U.S. Cl. ......................................... 428/1; 350/341
[58] Field of Search ............................. 428/1; 350/341

[56] References Cited

U.S. PATENT DOCUMENTS

| 3,308,078 | 3/1967 | Rogers et al. | 260/27 |
| 4,013,607 | 3/1977 | Dwyer et al. | 260/29.6 TA |
| 4,207,671 | 6/1980 | Gharadjedaghi et al. | 29/582 R |
| 4,317,755 | 3/1982 | Gregory | 524/276 |
| 4,353,943 | 10/1982 | Crossland et al. | 428/1 |
| 4,437,731 | 3/1984 | Sudo et al. | 350/340 |
| 4,494,824 | 1/1985 | Nakamura et al. | 350/334 |
| 4,514,043 | 4/1985 | Ahne et al. | 350/341 |

FOREIGN PATENT DOCUMENTS 1135413 9/1982 Canada .............................. 352/32.4

Primary Examiner—Alexander S. Thomas
Attorney, Agent, or Firm—Birgit E. Morris; R. Hain Swope

[57] ABSTRACT

Liquid crystal displays are improved by using as the alignment layer an alkali-soluble resin which is an addition resin of (a) at least one ethylenically unsaturated, ligand-free monomer and (b) at least one ethylenically unsaturated monomer having at least one carboxyl group. The resin is optically clear and is characterized by being exceptionally stable.

7 Claims, 1 Drawing Figure

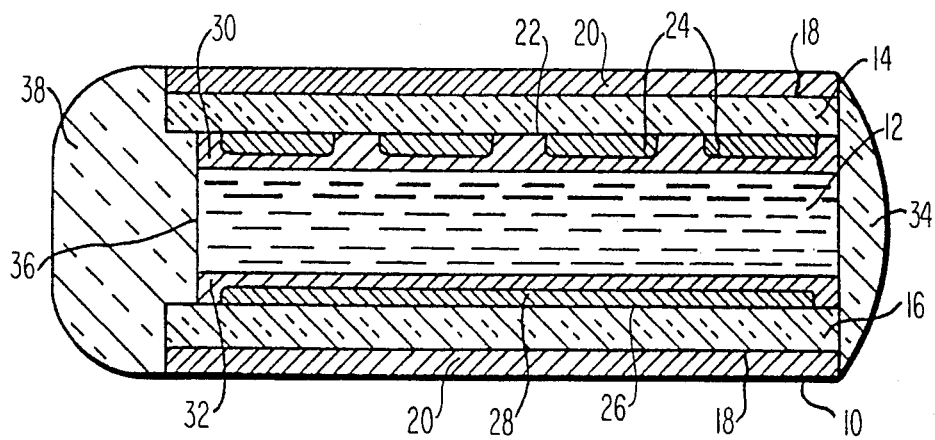

ALIGNMENT LAYER FOR LIQUID CRYSTAL DISPLAY

This invention relates to a liquid crystal display, specifically to a novel alignment layer in such a display.

BACKGROUND OF THE INVENTION

A liquid crystal display (LCD) comprises liquid crystal material contained between two conductive substrates which are sealed at their periphery. The liquid crystal substrates are conventionally comprised of plates of glass or plastic which are selectively coated with an electroconductive film which in turn is coated with an alignment layer.

It is the function of the alignment layers to orient the liquid crystal molecules in the LCD in a homogeneous manner. The capacity of the alignment layer to orient liquid crystal material is created conventionally by unidirectionally rubbing the layer with a soft material such as cotton cloth or paper. Liquid crystal molecules adjacent to the surface will then align parallel to the rubbed lines on the surface. When the rubbed lines on alignment layers in an LCD are in parallel orientation, the liquid crystals are in parallel homogeneous alignment. Twisted liquid crystal devices are formed by positioning the alignment layers in the device so that the rubbed lines are at right angles.

A number of materials have been proposed for the formation of alignment layers. These include a layer of silicon dioxide deposited at an incidence angle of about 5°; polyimides; polyamides; organosilanes; and poly(vinyl alcohol). Each of these materials has certain disadvantages. Slant-evaporated silicon dioxide, for example, is comparatively difficult to apply. Polyimides, although stable to processing temperature of up to about 300° C., are electrically insulating. It is difficult to make electrical contact through a layer of polyimide resin without removing a portion thereof, which may be troublesome once it is cured. Also, certain epoxy resin sealants for the periphery of the LCD do not adhere well to polyimide resins.

Polyamides, like polyimides, have a comparatively high cure temperature and also are electrically insulating. Further, polyamides undergo hydrolysis more readily than polyimides.

Organosilanes are very good alignment materials which can tolerate temperatures of from 200° up to about 450° C. The organosilanes, however, have essentially no blocking capacity against the passage of moisture and ions, particularly sodium ions, which can migrate from glass substrates into the liquid crystal material. This is a decided disadvantage in view of the recognized instability of liquid crystal materials to these impurities.

Poly(vinyl alcohol) is also a very good alignment material. However, it is stable only to from about 85° to 95° C. Hence, it cannot be used with any sealant composition which must be cured above these temperatures. Also, poly(vinyl alcohol) is only an adequate barrier against the passage of moisture and ions.

In accordance with this invention, a material has been found which does not suffer the disadvantages of previously used alignment materials.

SUMMARY OF THE INVENTION

Alignment layers in a liquid crystal display are formed of optically clear, alkali-soluble resins which are an additional product of (a) at least one ethylenically unsaturated, ligand-free monomer and (b) at least one ethylenically unsaturated monomer having at least one ligand, i.e. a carboxyl group.

BRIEF DESCRIPTION OF THE DRAWING

The FIGURE is a sectional view of a typical LCD depicted along a line which bisects the fill port.

DETAILED DESCRIPTION OF THE INVENTION

The FIGURE illustrates a cross section of a typical twisted nematic liquid crystal device (LCD) 10. The LCD 10 is comprised of two substrates 14 and 16 which are suitably of glass or plastic and a liquid crystal material 12 therebetween. On the outer surface 18 of the substrates 14 and 16 are linear polarizer layers 20 which are aligned cross-wise to each other.

On the inner surface 22 of substrate 14 are arranged a plurality of transparent electrodes 24. On the inner surface 26 of substrate 16 is an electrode layer 28. These electrode structures are conventionally in the form of electrically conductive coatings of a material such as tin oxide, indium oxide, mixtures thereof and the like. The electrodes are in turn coated with alignment layers 30 and 32. The transparent substrates 14 and 16 are separated by spacers, not illustrated, and a sealant 34 is arranged around the periphery of the substrates 14 and 16 with the exception of the fill port 36, thus producing an opening into which the liquid crystal material 12 is inserted. A sealant 38 over the fill port 36 completes the LCD.

LCDs are typically manufactured by coating the substrates with the individual layers of material, positioning them generally in the relationship illustrated in the FIGURE and sealing the periphery except for one or more fill ports 36. The liquid crystal material is inserted into the device and the fill ports are sealed. The device is then tested to determine whether the seal is complete and the liquid crystal material is stable.

The alignment layers 30 and 32 are critical, not only to the functioning of an LCD, but to its stability as well. The liquid crystal materials conventionally used in LCDs are sensitive to: extreme temperatures; certain ions, such as sodium ion, which can leach out of the glass substrates; and components of the materials they contact such as the alignment layers or the fill port seal which can be absorbed into the liquid crystal material, forming impurities. Components of liquid crystal materials can also be absorbed into the alignment layer in certain instances. The alignment layers of this invention are advantageous in that they are chemically compatible with all conventional types of liquid crystals tested, e.g. cyclohexane-, pyrimidine-, biphenyl- and ester-type liquid crystal materials. These types of material can be utilized in LCDs prepared in accordance with this invention.

In accordance with this invention, alignment layers in an LCD are formed of an alkali-soluble addition resin of at least two ethylenically unsaturated monomers, at least one of which is ligand-free and at least one of which contains a ligand, i.e. a carboxyl group. Alignment films formed from the subject resins are optically clear, a decided advantage over such prior alignment layer materials as polyimides, particularly for color applications. A suitable subject resin is commercially available under the tradename Future Floor Polish from S. C. Johnson & Son, Inc.

The subject resins and suitable compositions containing them are disclosed in Dwyer et al., U.S. Pat. No. 4,013,607, issued Mar. 22, 1977. Suitable resins are also disclosed in Rogers et al., U.S. Pat. No. 3,308,078, issued Mar. 7, 1967 and Gregory, U.S. Pat. No. 4,317,755, issued Mar. 2, 1982.

The subject resins suitably have a molecular weight of from about 500 to 30,000, preferably from about 500 to 10,000, and an acid number of from about 120 to 550. The subject resins contain from about 40 to 75 percent of one or more ligand-free ethylenically unsaturated monomers with the balance being one or more ethylenically unsaturated monomers containing a ligand, i.e. a carboxyl group.

Examples of suitable ligand-free monomers include vinyl toluene, methyl methacrylate, butyl methacrylate, acrylonitrile, vinyl acetate, styrene, alpha methyl styrene, butyl acrylate, ethacrylate, 2-ethyl-hexyl acrylate and the like. Suitable ligand-containing monomers are ethylenically unsaturated alkanoic and alkanedioic acids, particularly those containing 3 to 8 carbon atoms. Examples of such acids include acrylic, methacrylic, crotonic, isocrotonic, maleic, fumaric and itaconic acids, and anhydrides thereof.

Particularly suitable combinations of monomers include: styrene/acrylic acid; styrene/maleic anhydride; methyl methacrylate/butyl acrylate/methacrylic acid; alpha-methyl styrene/ethyl acrylate/acrylic acid; styrene/butyl acrylate/acrylic acid; styrene/methyl methacrylate/butyl acrylate/methacrylic acid; and the like. In general, styrene/acrylic acid resins having number average molecular weights from about 2,500 to 4,500 and weight average molecular weights of from about 6,500 to 9,500, as well as an acid number of from about 170 to 200 are particularly suitable. A preferred resin is comprised of about 68 percent of styrene and about 32 percent of acrylic acid.

The subject resins are typically dissolved in water containing sufficient ammonia to provide a pH of at least about 9.0, suitably at least about 9.5. Although ammonia is preferred, another base such as an organic amine may be utilized to provide the desired pH. The solvent also contains from 0 to 10 percent by weight of an organic solvent comprised of a polyhydroxy polyether, a lower alkanol or a high-boiling glycol. Typical polyethers include mono- and di-alkyl ethers of diethylene glycol and their derivatives, also known as carbinols. A particularly suitable ether is diethylene glycol mono-ethyl ether.

The total amount of water in the composition can vary from about 20 percent by weight to 96 percent by weight depending, for example, on whether a dilutable concentrate is desired. For purposes of forming the subject alignment layers, about 80 to 92 percent by weight of water is preferred.

The compositions containing the subject resins may also contain a number of other ingredients. There is present, for example, from 0 to about 10 percent by weight of one or more plasticizers to improve the film forming properties of the resin. The plasticizer may be a permanent type such as an alkyl or aryl phthalate or citrate, or a fugitive plasticizer such as benzyl alcohol or a monoalkyl ether of diethylene glycol. A particularly suitable plasticizer is tributoxyethyl phosphate, which also functions as a leveling agent.

The composition may contain one or more nonionic and/or an anionic surfactants, suitably nonfoaming types of surfactants. Typical nonionic surfactants are ethylene oxide condensate emulsifiers. Typical low-foaming anionic surfactants are ammonium salts of higher fatty acids having 12 to 22 carbon atoms. The compositions suitably contain from 0 to about 5 percent by weight of the surfactant.

In addition to the functioning of some plasticizers and surfactants as leveling agents, the compositions containing the subject resins may contain from 0 to about 5 percent by weight of an art-recognized leveling agent such as gelatine, certain perfluorinated cyclo-compounds and the like.

The compositions may further contain from 0 to about 15 percent by weight of a natural and/or synthetic wax such as polyethylene or polypropylene wax, from 0 to about 10 percent of a film-modifying polymer having a molecular weight in excess of 40,000 and often in excess of 200,000 and minor amounts of other conventional additives such as fragrances, stabilizers and the like.

Although the solvent, plasticizer, surfactant, leveling agent, wax, film-modifying polymer or any combination thereof may be omitted from the compositions utilized as alignment layers in accordance with this invention, the combined nonvolatiles of these ingredients must be at least equal to 9 and below 200 percent by weight of the nonvolatiles of the resin for good film forming properties. Also, the total nonvolatiles content of the composition should be from about 4 to 55 percent by weight.

The composition containing the subject resins should be free of complex salts of cross-linking metals. These salts, which are described in detail in U.S. Pat. No. 3,308,078, are, in essence, comprised of:

(a) a metal ion, i.e. Zn(II), Cd(II), Cu(II) or Ni(II), which represents a bridging group that is capable of undergoing ligand transfer;

(b) a fugitive ligand, such as ammonia, which readily converts under certain conditions to a volatile gas; and (c) an anion such as acetate, formate, carbonate and/or an organic film former comprising a resin, a polymer or mixtures thereof.

The subject resins, suitably in a commercial form, is applied, suitably by spin-coating, to a liquid crystal device substrate, typically comprised of a glass plate having on a major surface a layer of a transparent electrode such as tin oxide, indium oxide and the like. The coating is typically allowed to air-dry and then baked at from about 50° to 75°, preferably about 65° C., for about one hour. This comparatively low temperature is an additional advantage of the subject resins in comparison to conventional polyimides and polyamides which must be cured at substantially higher temperatures. The resulting alignment layer is suitably at least about 0.5, preferably between about 1.0 and 10, nanometers thick. The alignment layer is allowed to cool after curing and is then conventionally rubbed utilizing a flannel cloth or buffing wheel.

The LCD is conventionally completed and assembled, i.e. two such substrates are positioned opposite to each other with the alignment layers facing. Utilizing spacers to separate the substrates, the periphery is sealed with the exception of the fill port 28. Liquid crystal material is inserted into the space between the substrates until it is full and the fill port 28 is sealed with an appropriate sealant to completely seal the LCD. A preferred sealant composition for both the periphery and the fill hole is an epoxy resin formed from a diglycidylether of bisphenol A precursor and triethylenetetramine as a curing agent hardener therefor as described in McClelland et al. copending U.S. Pat. Application Ser. No. 787,679, filed Oct. 15, 1985, the disclosure of which is incorporated herein by reference.

In addition to being optically clear, curable at comparatively low temperatures, comparatively easy to apply and compatible with conventional liquid crystal materials, as well as other materials conventionally utilized in preparing LCDs, the subject resins have demonstrated exceptional stability when subjected to both thermal shock and elevated temperatures for extended periods of time. Further, the subject resins have been found to provide an adequate barrier against the passage of moisture and ions from the substrates into the liquid crystal material.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

Glass plates 4.8 cm×5.8 cm×1.3 mm, coated on a major surface with a 5 nm thick indium-tin oxide conductive layer, were utilized as substrates. A commercial preparation of a subject resin, i.e. Future Floor Polish, was spin-coated onto the indium-tin oxide layer and allowed to dry. After baking at 65° for one hour, the resin alignment layer was about 1 nm thick. Precise measurement of the thickness of the alignment layer was not possible due to the surface roughness of the indium-tin oxide layer. The resin layer was optically clear. After the substrates has cooled to room temperature, the alignment layers were uniformly rubbed with a flannel cloth. The substrates were positioned so that the direction of rubbing of each alignment layer was on a 45 degree angle to the other. Utilizing spacers to keep them from touching, the substrates were clamped together and the periphery sealed with the exception of a fill port. The biphenyl liquid crystal mixture ZLI2293, available from E. Merck, Inc., was inserted into the cell and the fill port was sealed. The sealant utilized was that described in the aforementioned McClelland et al. copending patent application.

The on-off function and alignment of the cell were checked and found to be excellent. The cell was stored at room temperature for two months and again checked as before. There was no apparent deterioration of either the function or the alignment of the LCD over this period of time.

EXAMPLE 2

A substrate having a surface layer of an indium-tin oxide was coated with a layer of a subject alkali-soluble resin in the manner described in Example 1. The resin layer was placed in contact with the liquid crystal of Example 1 for 124 hours at 60°. The nematic/isotropic transition temperature of the material was determined. The nematic/isotropic temperature is the temperature at which the liquid crystal becomes disordered as evidenced by its becoming transparent. Contamination of the liquid crystal material would cause an increase or decrease in the transition temperature. The determination was compared against a standard method for determining the transition temperature for any evidence of contamination of the liquid crystal material. None was found.

We claim:

1. In a liquid crystal display device comprising a layer of liquid crystal material sealed between two substrates which have electrodes formed thereon, the opposing inner surfaces of the substrates being covered with an alignment layer, the improvement wherein the alignment layer comprises an optically clear, alkali-soluble resin which is an addition product of at least one ethylenically unsaturated, ligand-free monomer and at least one ethylenically unsaturated monomer having at least one carboxyl group.

2. A display device in accordance with claim 1, wherein said resin has a weight average molecular weight of from about 500 to 30,000 and an acid number of from about 120 to 550.

3. A display device in accordance with claim 1, wherein said resin comprises from about 40 to about 75 percent of the ligand-free monomer component and from about 60 to about 75 percent of the carboxyl group-containing monomer component.

4. A display device in accordance with claim 1 wherein the ligand-free monomer comprises at least one member selected from the group consisting of vinyl toluene, methyl methacrylate, butyl methacrylate, acrylonitrile, vinyl acetate, styrene, α-methyl styrene, butyl acrylate, ethyl acrylate, 2-ethylhexylacrylate and mixtures thereof and the carboxyl group-containing monomer comprises at least one member selected from the group consisting of acrylic acid, methacrylic acid, crotonic acid, isocrotonic acid, maleic acid, fumaric acid and itaconic acid.

5. A display device in accordance with claim 4, wherein the resin is a styrene/acrylic acid resin having a number average molecular weight of from about 2,500 to 4,500 and a weight average molecular weight of from about 6,500 to 9,500.

6. A display device in accordance with claim 5, wherein the resin is comprised of about 68 percent of styrene and about 32 percent of acrylic acid.

7. A display device in accordance with claim 5, wherein the resin has an acid number of from about 170 to 200.

* * * * *